(12) United States Patent
Wilson et al.

(10) Patent No.: US 7,525,448 B1
(45) Date of Patent: Apr. 28, 2009

(54) ENHANCED VISION SYSTEM AND METHOD FOR AN AIRCRAFT

(75) Inventors: John G. Wilson, West Linn, OR (US); Kenneth A. Zimmerman, Lake Oswego, OR (US); Dean A. Schwab, Castle Rock, CO (US); Michael J. Oldham, Woodburn, OR (US); Robert E. Stockwell, Hillsboro, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 454 days.

(21) Appl. No.: 11/528,852

(22) Filed: Sep. 28, 2006

(51) Int. Cl.
*G01C 21/00* (2006.01)
(52) U.S. Cl. ............ 340/971; 340/945; 340/963; 340/964; 340/461; 342/26 B; 701/14
(58) Field of Classification Search .......... 340/971, 340/945, 953, 963, 964, 461, 539.28; 342/26 B, 342/74, 75, 195, 597; 701/14, 300
See application file for complete search history.

(56) References Cited

U.S. PATENT DOCUMENTS

| 5,198,819 | A | 3/1993 | Susnjara |
| 5,945,926 | A | 8/1999 | Ammar et al. |
| 6,762,801 | B2 * | 7/2004 | Weiss et al. ............ 349/16 |
| 6,828,922 | B1 * | 12/2004 | Gremmert et al. ........ 340/949 |
| 7,205,928 | B1 * | 4/2007 | Sweet ................ 342/26 B |
| 7,312,725 | B2 * | 12/2007 | Berson et al. ............ 340/980 |

\* cited by examiner

*Primary Examiner*—Hung T. Nguyen

(57) ABSTRACT

An aircraft optical display system for implementing an enhanced vision system based on weather conditions is described. The display system includes a plurality of imaging sensors configured to receive imaging input data and generate image data, where each imaging sensor is associated with one or more weather conditions. The system further includes a weather conditions input device configured to receive current weather condition information and a weather dependent imaging system configured to receive the current weather conditions information and to select one or more of the plurality of imaging sensors to provide imaging input data in accordance with the current weather conditions information.

20 Claims, 3 Drawing Sheets

ENHANCED VISION SYSTEM AND METHOD FOR AN AIRCRAFT

BACKGROUND

An enhanced vision system (EVS) for an aircraft is designed to enhance pilot situational awareness during flight at night or during poor weather conditions by providing a sensor enhanced view of the outside environment. The imagery may be displayed conformally on a combiner of a Head-up Guidance System, increasing both safety and operational capability of the aircraft.

Enhanced vision systems for aircraft utilize relatively high cost imaging sensors mounted to the body of the aircraft. The imaging sensors may include infrared sensors, thermal imagers, etc. configured to recognize image input data, such as incandescent light sources. However, thermal imagers are not configured to differentiate colors associated with the source of the incandescent light. These colors may be critical to a correct interpretation of an aircraft scene (e.g. VASI or PAPI lighting, rabbit-lights, end lights, center lights, edge lights, taxiway lights). Further, thermal imagers are not configured to recognize "cold" sources of light, such as reduced energy consumption light emitting diode (LED) or fluorescent lights sources that are increasingly being used at many airfields.

The performance of enhanced vision system sensors often differs greatly dependent on the current weather conditions. In particular, sensor performance may degrade during certain weather conditions such as high density fog and large rain drops. Performance degradation can be caused by increased signal scattering, dominant absorption, weak propagation, etc.

Accordingly, there is a need for an improved system and method of providing an enhanced vision system in an aircraft. Further, there is a need for such a system configured to recognize and adjust imaging sensor selections based on current weather conditions. Yet further, there is a need for such a system and method coupled to a head up guidance system to provide an enhanced conformal image. Yet further, there is a need for such a system and method configured to modify the conformal image based on detected weather conditions.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

What is provided is an aircraft optical display system for implementing an enhanced vision system based on weather conditions. The display system includes a plurality of imaging sensors configured to receive imaging input data and generate image data, where each imaging sensor is associated with one or more weather conditions. The system further includes a weather conditions input device configured to receive current weather condition information and a weather dependent imaging system configured to receive the current weather conditions information and to select one or more of the plurality of imaging sensors to provide imaging input data in accordance with the current weather conditions information.

What is also provided is an aircraft optical display system for implementing an enhanced vision system based on weather conditions. The display system includes a first imaging sensor configured to receive imaging input data within a variable bandwidth and generate image data, a weather conditions input device configured to receive information related to weather conditions, and a weather dependent imaging system configured to receive the weather conditions information and to modify the variable bandwidth of the first imaging sensor in accordance with the weather conditions information.

Further, what is provided is a method for implementing an enhanced vision system in an aircraft based on weather conditions. The method includes receiving information related to weather conditions, generating image data based on information generated by one or more sensor mounted to the body of the aircraft and the weather conditions information, and displaying the image data to an operator of the aircraft.

Alternative examples of other exemplary embodiments are also provided which relate to other features and combinations of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF PREFERRED AND EXEMPLARY EMBODIMENTS

Figure 1:
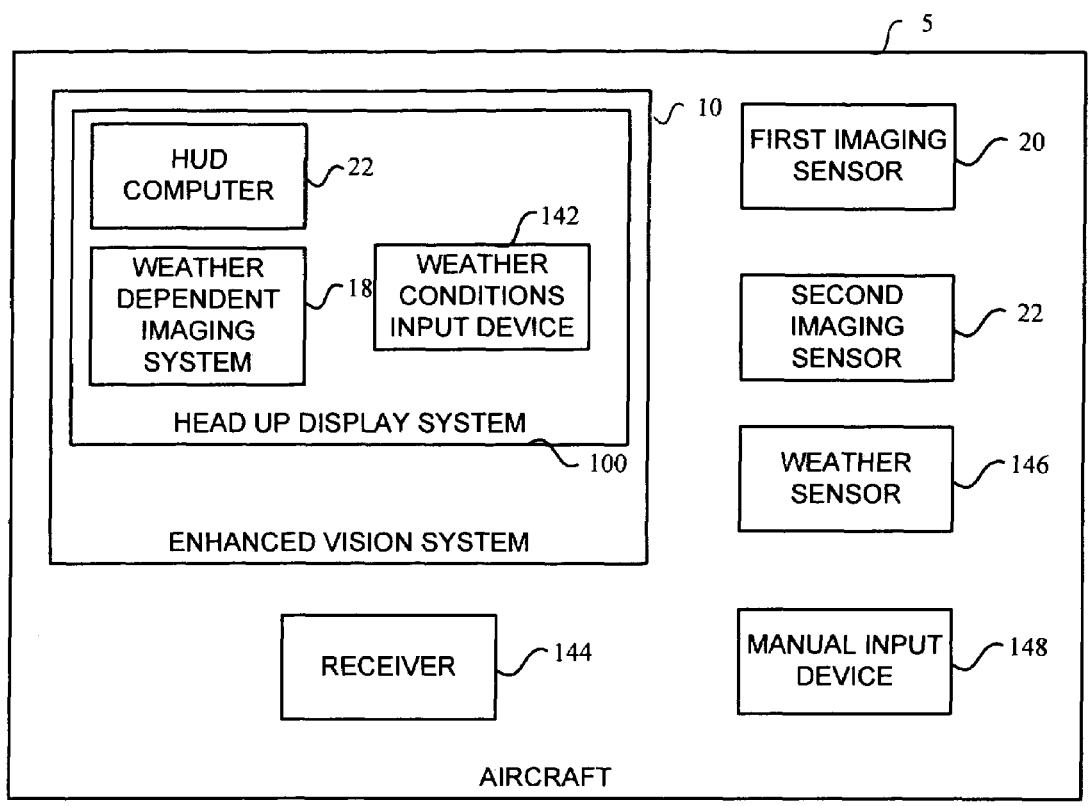
FIG. 1 is an enhanced vision system including a weather dependent imaging system, a head up display system including a HUD computer and an overhead projection unit, and an image combiner in a cockpit of an aircraft, according to an exemplary embodiment.

Before describing in detail the particular improved system and method, it should be observed that the invention includes, but is not limited to, a novel structural combination of conventional data/signal processing components and communications circuits, and not in particular detailed configurations thereof. Accordingly, the structure, methods, functions, control, and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

In an exemplary embodiment, a computer system is used which has at least one processing unit that executes sequences of instructions contained in a memory. More specifically, execution of the sequences of instructions causes the processing unit to perform steps, which are described below. The instructions may be loaded into a random access memory (RAM) for execution by the processing unit from a read-only memory (ROM), a mass storage device, or some other persistent storage. In other embodiments, hardwired circuitry may be used in place of, or in combination with, software instructions to implement the exemplary embodiments. Thus, the embodiments described herein are not limited to any specific combination of hardware circuitry and software, nor to any particular source for the instructions executed by the computer system.

Referring first to FIG. 1A, an enhanced vision system 10 including a first imaging sensor 20, an optional second imaging sensor 22, a head up display system 100 including a HUD computer 110 and an overhead projection unit 130, and an image combiner 150 in a cockpit of an aircraft 5 is shown, according to an exemplary embodiment. Although vision system 10 is shown with particular components arranged in a particular configuration, system 100 may alternatively include more, fewer, and/or a different configuration of components to perform the functions described herein.

According to an exemplary embodiment, first imaging sensor 20 may be a complimentary metal oxide semiconductor (CMOS) active pixel sensor having a high dynamic range. Accordingly, first imaging sensor 20 may be configured to sense imaging input data within a large wavelength range from visible light to near-infrared. First imaging sensor 20 may be particularly configured to sense a variety of different types of available imaging input data based on the weather conditions experienced by aircraft 5. Accordingly, imaging sensor 20 may be configured to allow for selection from among a variety of different IR bands of varying widths.

According to an alternative embodiment, wherein aircraft 5 includes at least a second imaging sensor 22, first imaging sensor 20 may be a cooled InSb (Indium Antimonide) infrared imaging sensor and second imaging sensor 22 may be a microbolometer imaging sensor. The type of sensors used for first and second imaging sensors 20 and 22 may be selected based on differing performance in various weather conditions. For example, for the exemplary sensors described above, a cooled InSb imaging sensor performs better in warmer, humid weather, while microbolometers perform better in cool, dry climates. Although two exemplary imaging sensors are described above, it should be understood that aircraft 5 may include any number and/or type of imaging sensors to perform the functions described herein.

HUD computer 110 may be configured to implement a weather dependent imaging system 140 using a combination of hardware and/or software. Weather dependent imaging system 140 is configured to receive an information of current weather conditions and to optimize performance of enhanced vision system 10 based on the weather conditions. Optimizing performance may include modifying a band utilized by an imaging sensor, selecting an image sensor used to gather image data, modifying output of HUD computer 110, etc.

Imaging system 140 may be coupled to a weather conditions input device 142. Weather conditions input device 142 may be any type of device configured to receive an information of current weather conditions from any and/or a plurality of weather input sources. Exemplary weather input sources may include, but are not limited to, a receiver 144, a weather sensor 146, and a manual input device 148. Receiver 144 may be any type of receiver configured to receive one or more signals containing weather conditions indications from a remote source, such as an air traffic controller, a weather beacon, a satellite broadcast, a weather sensor, etc. Weather sensor 146 may include any type of sensor mounted to the outside of the aircraft configured to sense one or more weather conditions such as temperature, humidity, precipitation, etc. Manual input device 148 may be an input device positioned within the cockpit of an aircraft configured to allow an operator to manually enter or select a weather conditions information.

Imaging system 140 may be configured to select from one of sensors 20 and 22 or to modify the operation of sensors 20 and 22 to optimize output based on one or more received weather conditions indications. Imaging system 140 may include a database including an information of optimal configurations based on a wide variety of weather conditions to optimize output. For example, when received weather conditions information (such as temperature and humidity) indicate that outside conditions have reached a predefined set point, imaging system 140 may perform some action, such as utilizing a different sensor, filtering the infrared band through one of the sensors, modifying the output produced (e.g., increasing the brightness and/or contrast of the video image produced), providing an announcement to the aircraft operator such that the operator may manually select a sensor as desired, etc.

Imaging system 140 may further be configured to provide imaging data that is a composite of imaging data received from two or more sensors. For example, imaging data received from a first sensor may be presented to a pilot at the same time as imaging data from a second sensor in an overlapping fashion. Alternatively, using more advanced image processing techniques, imaging data from a first sensor may be analyzed to detect deficiencies. HUD computer 100 may be configured to correct any detected deficiencies using imaging data from one or more additional sensors.

Weather dependent imaging system 140 may be configured to maintain a database of weather conditions and display settings used to make the above described modifications to image data and/or the operation of one or more systems. The modification may be pre-determined (i.e., hard coded into system 140), dynamically determined based on certain performance and/or mission characteristics (e.g., a steep/rapid ascent or decent requiring a broader infrared band, a delayed switch between sensors, etc.), commanded from a remote controller (i.e., an air traffic controller) via voice commands or a digital command interface such as datalink, and/or selectable by the operator of the aircraft via an on-board menu interface. The modification may also be determined using a combination of any of the above described methods.

HUD computer 110 and an overhead projection unit 130, may be configured to generate a video image to be displayed to a pilot or other operator of the aircraft based at least in part on output provided by the weather dependent imaging system 140. The video image may be generated by HUD computer 110 and projected through overhead projection unit 130 onto combiner 150.

Combiner 150 is a plate of partially-reflective (coated) glass, consequently, it will allow some external light to pass through it and will also reflect part of the light projected onto it by the lens system. In this manner, both images, external and projected, can be viewed simultaneously. Accordingly, the image generated using weather dependent imaging system 140 may be superimposed over the pilots view of the external aircraft view.

Figure 2:
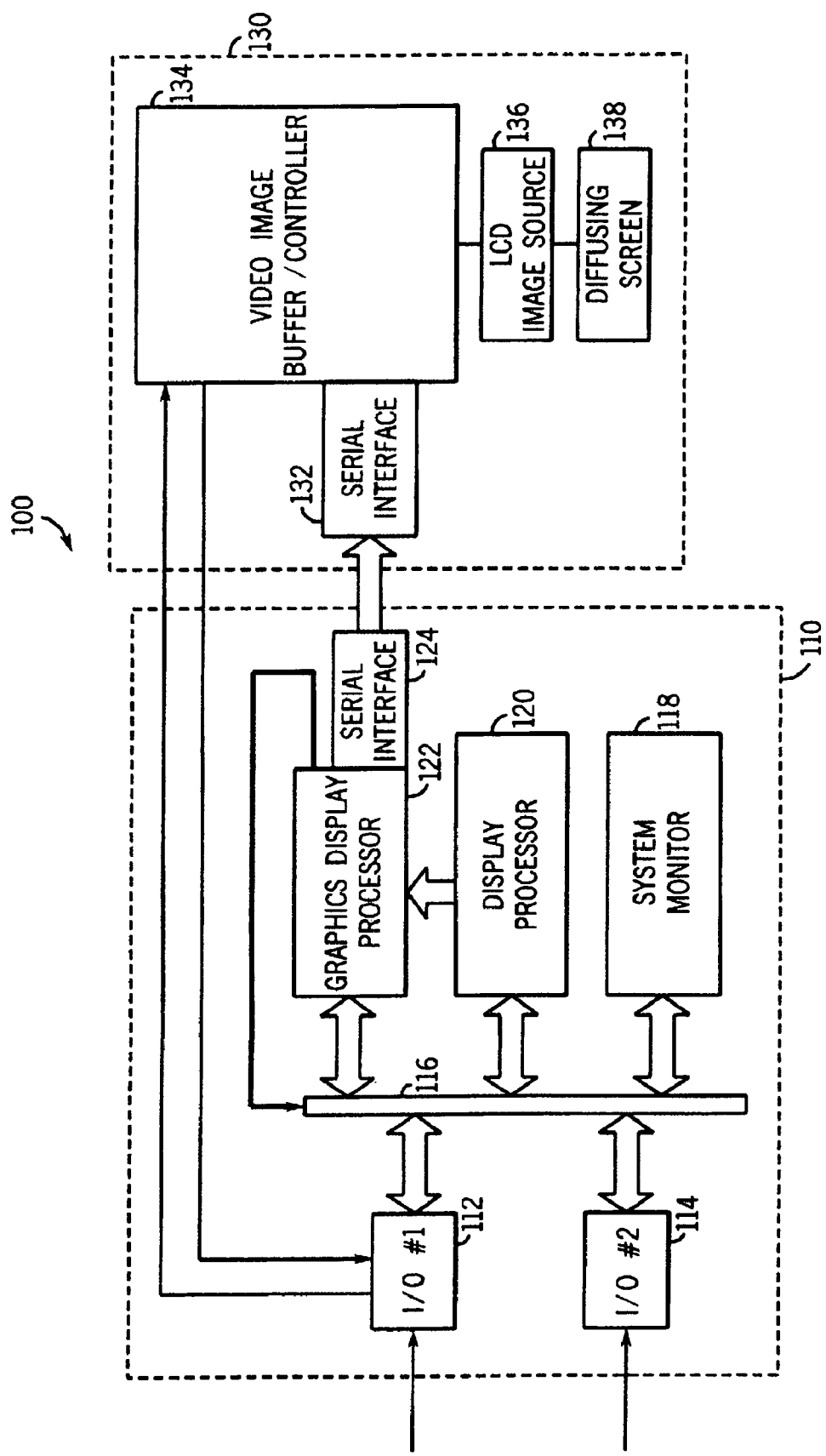
FIG. 2 is a block diagram is illustrated depicting a LCD based head-up display (HUD) system, according to an exemplary embodiment.

Referring now to FIG. 2, a block diagram is illustrated depicting a LCD based head-up display (HUD) system 100, according to an exemplary embodiment. HUD system 100 includes the HUD computer 110 and an overhead projection unit 130 described above with reference to FIG. 1.

HUD computer 110 is a computer system including a first input and output port 112, a second input and output port 114, a data bus 116, a system monitor 118, a display processor 120, and a graphics display processor 122. The graphics display processor further includes a serial interface 124.

HUD computer 110 includes first input and output port 112 and second input and output port 114 to create dual input/output (I/O) channels to eliminate undetected sensor based errors. First input and output port 112 and second input and output port 114 are each coupled to a unique avionic data bus carrying sensor data (e.g. aircraft three dimensional velocity data) for the aircraft. For example, sensors 20 and 22 may be coupled to first input port 112 to transfer image data to HUD computer 110. These aircraft buses may be implemented using the ARINC 429 data bus protocol. Both first input and output port 112 and second input and output port 114 are coupled to both external ARINC data buses (not shown) and internal data bus 116.

Internal data bus 116 is configured to implement a first method for transferring data within HUD computer 110. Data bus 116 may be any type of data bus implementing any of a variety of data bus protocols. According to an exemplary embodiment, data bus 116 is a Peripheral Component Interconnect (PCI) bus.

System monitor 118 is a processor configured to receive sensor feedback values from sensors within the HGS system 100 and compare the received sensor feedback values with expected value or received redundant sensor values. According to an exemplary embodiment, system monitor 118 is a 200 MHz PowerPC processor manufactured by Motorola of Schaumburg, Ill. Whenever system monitor 118 detects a sensor comparison failure, a warning message is conveyed to be displayed on display processor 120 for response. System monitor 118 is coupled to data bus 116.

Display processor 120 is a processor configured to validate and compare input sensor data, determine the symbology set displayed to the pilot based on the phase of flight (take off, cruise, approach, landings), compute the position of all symbology, compute any guidance algorithms controlling the position of the guidance cue, and generate and format a display list for graphics display processor 122. Display processor 120 is the main controller for HUD system 100 and is configured to manage the flow of data through the data path. Display processor 120 is coupled to data bus 116 and graphic display processor 122.

Display processor 120 is configured to receive image data from imager 20 and process the image data for display to the pilot of aircraft 5. Processing the image data may include de-weathering the image, conforming the image based on received infra-red sensor information, displaying the image on combiner 150 using overhead projection unit 130, etc., described in further detail below with reference to FIG. 3.

Graphics display processor 122 is a processor configured to receive graphics instructions from display processor 120 and convert the data into graphical data for transmission through serial interface 124 to overhead projection unit 130. According to an exemplary embodiment, graphics display processor 122 is a graphics engine operating on a processor to turn graphics instruction into a pixel representation of an image. Graphics display processor 122 is coupled to data bus 116 and display processor 120. Graphics display processor 122 further includes serial interface 124 through which data is transmitted to overhead projection unit 130.

Although HUD computer 110 is shown in FIG. 1 with a specific configuration of components and couplings, it is understood that HUD computer 110 may include more, fewer, or different components in a variety of arrangements that are configured to perform the functions described herein. For example, according to an alternative embodiment, HUD computer 110 may further include a low voltage power supply that is configured to provide power to the components of HUD computer 110. Further, the components may be independent components configured to interact to perform the functions described herein as well as additional functions. Yet further, function described as being performed by separate components may be performed by a single component.

Overhead projection unit 130 includes a serial interface 132, a video image buffer/controller 134, a LCD image source 136, and a diffusing screen 138. Overhead projection unit 130 is generally configured to receive graphical data from graphics display processor 122 through serial interface 132, process the information in image buffer/controller 134, and display the information using LCD image source 136 through diffusing screen 138. Overhead projection unit 130 may also include additional components. For example, a light source may reflect an image from or transmit through LCD image source 136 through a series of lenses and/or reflectors through diffusing screen 138 to display the image shown using LCD image source 136. Further, following diffusion of the image by diffusing screen 138, further image formation may occur using any of a variety of imaging components such as lenses, reflectors, etc.

Video image buffer/controller 134 is a processor including memory that is configured to receive graphical data from graphics display processor 122, verify the integrity of the received graphical data, generate display data from the graphical data, and transfer the graphical data to LCD image source 136. According to an exemplary embodiment, video image buffer/controller 134 is a programmable logic device. According to alternative embodiments, video image buffer/controller may be a processor, software, hardware, etc. configured to provide the functions described herein. Video image buffer/controller 134 is coupled to the serial interface 132 to receive data from serial interface 124 of graphics display processor 122. Video image buffer/controller 134 is further coupled to LCD image source 136 to transmit display data to LCD image source 136.

LCD image source 136 is a LCD image source configured to display the display data received from video image buffer/controller 134. The image displayed on LCD image source 136 is projected through diffusing screen 138. Images generated by LCD image source 136 may be displayed on a combiner and viewed by a pilot of the aircraft.

According to an exemplary embodiment, diffusing screen 138 is a screen configured to scatter the light into a cone angle of known and predetermined characteristics. Diffusing screen 138 is configured to maximize light transmission while scattering light in a predetermined, specific direction. According to an exemplary embodiment, diffusing screen 138 may be a rear projection screen commonly used in rear projection television systems and other rear projection displays.

Figure 3:
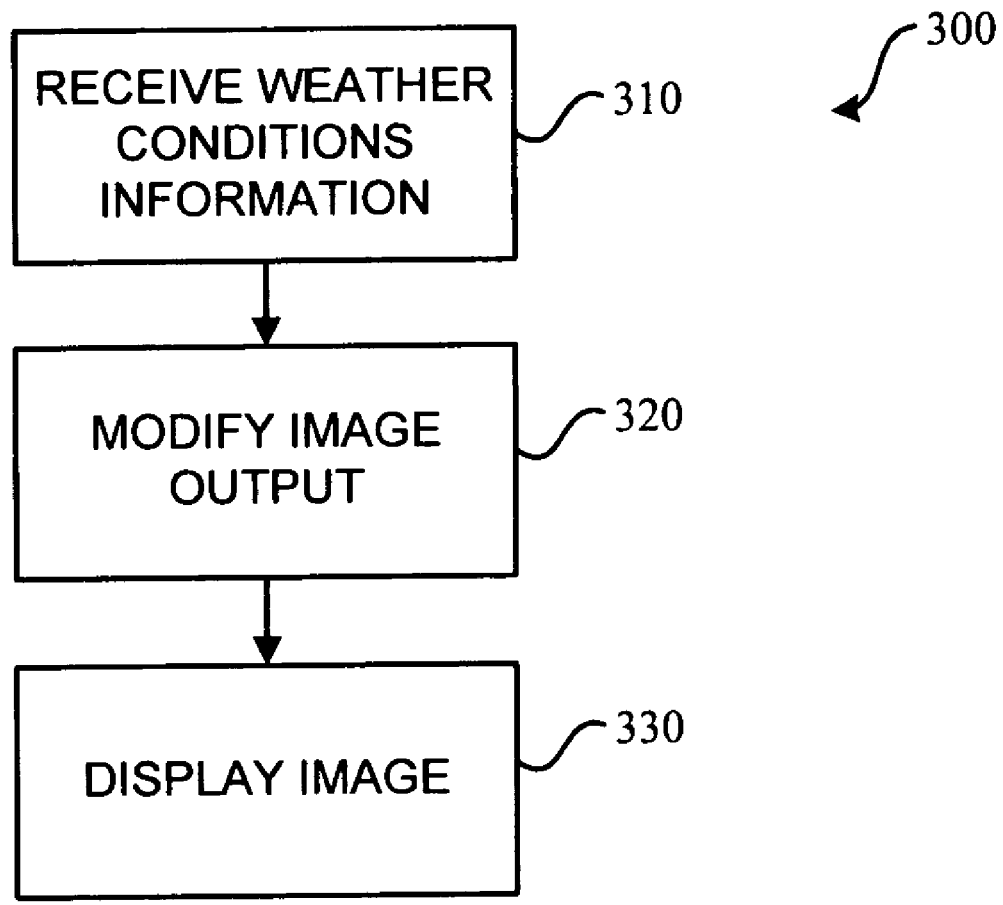
FIG. 3 is a flowchart illustrating a method for generating image data for display to the operator of an aircraft based at least in part on weather conditions information, according to an exemplary embodiment.

Referring now to FIG. 3, a flowchart 300 illustrating a method for displaying an image on combiner 150 based on image data received from weather dependent imaging system 140 is shown, according to an exemplary embodiment. Although specific steps are shown in a specific order, it should be understood that the method may include more, fewer, and/or a different ordering of steps to perform the functions described herein.

In a step 310, HUD computer 110 is configured to receive one or more weather conditions indications. The received weather conditions indications may be received from one or more sensors, from an external source through a receiver, through manual input by an operator, etc. The received weather data information may include any information configured to affect the operation of system 140 based on weather conditions such as temperature information, humidity information, precipitation information, operator selection information based on a selection made by an operator based on weather conditions, etc.

In a step 320, HUD computer 110, through weather dependent imaging system may be configured to modify the image output displayed on combiner 130 based on the received weather conditions information. Modifying image output may including changing a brightness, changing a contrast, changing a band on a sensor used to receive the image data, changing a sensor used to received the weather data, etc. HUD computer 110 may be configured to generate an enhanced external scene image based at least in part on the image data received from weather dependent imaging system 140. The enhanced external scene image may be generated also based on additional sensor or database information such as thermal infrared information, radar information, airport topology information, etc. An enhanced external scene image may include a representation of the external view to the aircraft featuring one or more enhancements based on the received weather conditions information.

An exemplary enhancement may include displaying a representation of the external scene on a display where the representation is unaffected by weather conditions external to the aircraft. For example, a representation of the pilot view may be shown where the visible imaging input data image has been processed to remove the effects of fog, rain, snow, etc.

In a step 330, the enhanced image may be displayed to a pilot of aircraft 5. Displaying the enhanced image may include displaying the image on combiner 150 using overhead projection unit 130, displaying the image on a console display, etc. The displayed image may be displayed in color or monochrome. Advantageously, because image sensor 20 can sense imaging input data from sources that are beyond the wavelength seen through human vision, the enhanced image may include features that cannot de discerned by the naked human eye.

While the detailed drawings, specific examples, and particular formulations given described preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the computing devices. For example, the type of computing device, communication bus or processor used may differ. The systems and methods depicted and described are not limited to the precise details and conditions disclosed. Furthermore, other substitutions, modifications, changes, and omissions may be made in the design, operating conditions, and arrangement of the exemplary embodiment without departing from the scope of the invention as expressed in the appended claims.

What is claimed is:

1. An aircraft optical display system for implementing an enhanced vision system based on weather conditions, the display system comprising: a plurality of imaging sensors configured to receive imaging input data and generate image data, each imaging sensor being associated with one or more weather conditions; a weather conditions input device configured to receive current weather conditions information; a weather dependent imaging system configured to receive the current weather conditions information and to select one or more of the plurality of imaging sensors to provide the image data in accordance with the current weather conditions information; and a combiner configured to enable viewing of the world outside of the combiner, wherein an optimized output image corresponding to the image data is projected on the combiner in accordance with the weather conditions information, wherein the image data is modified by the weather dependent imaging system based upon the weather conditions information to provide the optimized output image, the optimized output image being optimized with respect to degradation due to the weather conditions.

2. The aircraft optical display system of claim 1, wherein the degradations are due to fog.

3. The aircraft optical display system of claim 2, wherein projecting on the combiner in accordance with the weather conditions information includes adjusting a brightness of the image projected on the combiner.

4. The aircraft optical display system of claim 1, wherein the weather conditions input device is configured to receive the weather conditions information from a remote location.

5. The aircraft optical display system of claim 1, wherein the weather conditions input device is configured to receive the weather conditions information as a manual input from an operator of the aircraft.

6. The aircraft optical display system of claim 1, wherein the weather dependent imaging system is configured to modify the image data by removing weather effects from the image data based on the received weather conditions information.

7. An aircraft optical display system for implementing an enhanced vision system based on weather conditions, the display system comprising: a first imaging sensor configured to receive imaging input data within a variable bandwidth and generate image data; a weather conditions input device configured to receive information related to weather conditions; a weather dependent imaging system configured to receive the weather conditions information and to modify the variable bandwidth of the first imaging sensor in accordance with the weather conditions information; and a combiner configured to enable viewing of the world outside of the combiner, wherein an image corresponding to the image data is projected on the combiner in accordance with the weather conditions information; wherein the weather dependent imaging system is configured to modify the image data by removing weather effects from the image data based on the received weather conditions information.

8. The aircraft optical display system of claim 7, wherein the weather dependent imaging system modifies the variable bandwidth dynamically by filtering the infrared band to either broaden or narrow the band to optimize sensor performance based on the weather conditions information.

9. The aircraft optical display system of claim 7, wherein the image data is modified to provide enhanced image data the enhanced image data being enhanced with respect to degradation due to the weather conditions.

10. The aircraft optical display system of claim 9, wherein projecting on the combiner in accordance with the weather conditions information includes adjusting a brightness of the image projected on the combiner.

11. The aircraft optical display system of claim 7, wherein the weather conditions input device is configured to receive the weather conditions information from a remote location.

12. The aircraft optical display system of claim 7, wherein the weather conditions input device is configured to receive the weather conditions information as a manual input from an operator of the aircraft.

13. The aircraft optical display system of claim 7, wherein the weather conditions include fog.

14. A method for implementing an enhanced vision system in an aircraft based on weather conditions, the method comprising: receiving information related to weather conditions;

generating image data based on information generated by one or more sensors mounted to the body of the aircraft and the weather conditions information; and displaying an image corresponding to the image data to an operator of the aircraft, wherein displaying the image data to an operator of the aircraft includes projecting the image data on a combiner in accordance with the weather conditions information, wherein generating image data based on weather conditions information includes modifying the image data by removing weather effects from the image data based on the received weather conditions information.

15. The method of claim 14, wherein generating image data based on weather conditions information includes modifying a variable bandwidth for an infrared sensor by filtering the infrared band to either broaden or narrow the band to optimize sensor performance.

16. The method of claim 14, wherein generating image data based on weather conditions information includes selecting an imaging sensor based on the weather conditions information.

17. The method of claim 14, wherein the image data is enhanced to ameliorate degradation due to the weather conditions.

18. The method of claim 17, wherein the weather conditions include fog.

19. The method of claim 14, wherein receiving information related to weather conditions includes receiving the weather conditions information from a remote location.

20. The method of claim 14, wherein receiving information related to weather conditions includes receiving a manual input from an operator of the aircraft.

* * * * *